Jan. 14, 1941.  R. B. PRESSLER  2,228,401
SEPARATING MECHANISM
Filed Nov. 24, 1937  4 Sheets-Sheet 4
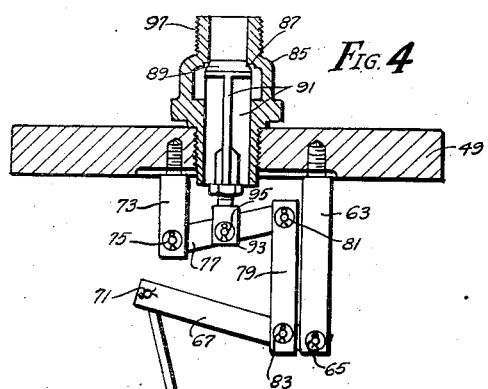
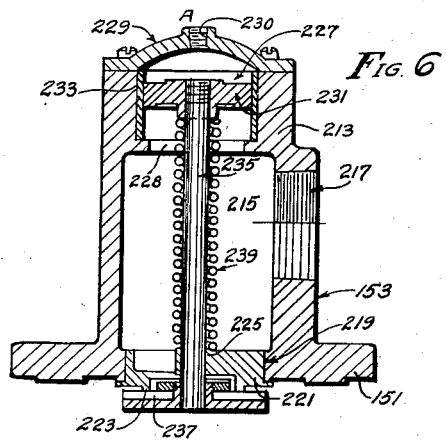
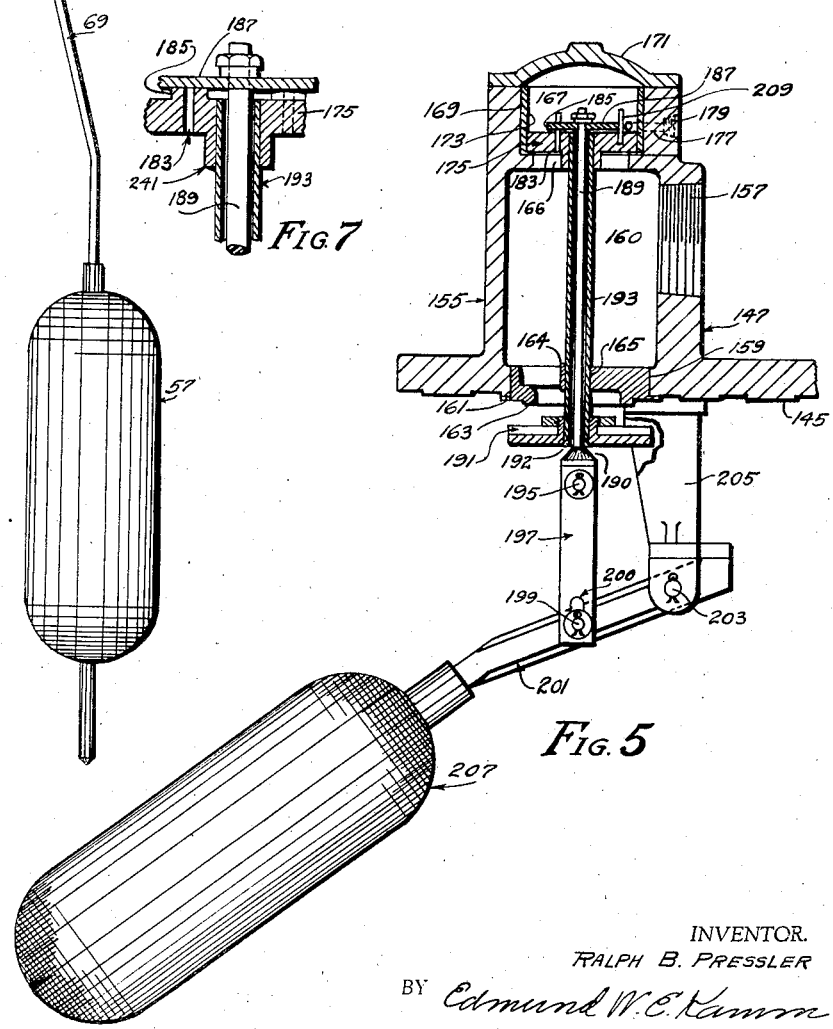
INVENTOR.
RALPH B. PRESSLER
BY Edmund W. E. Kamm
ATTORNEY.

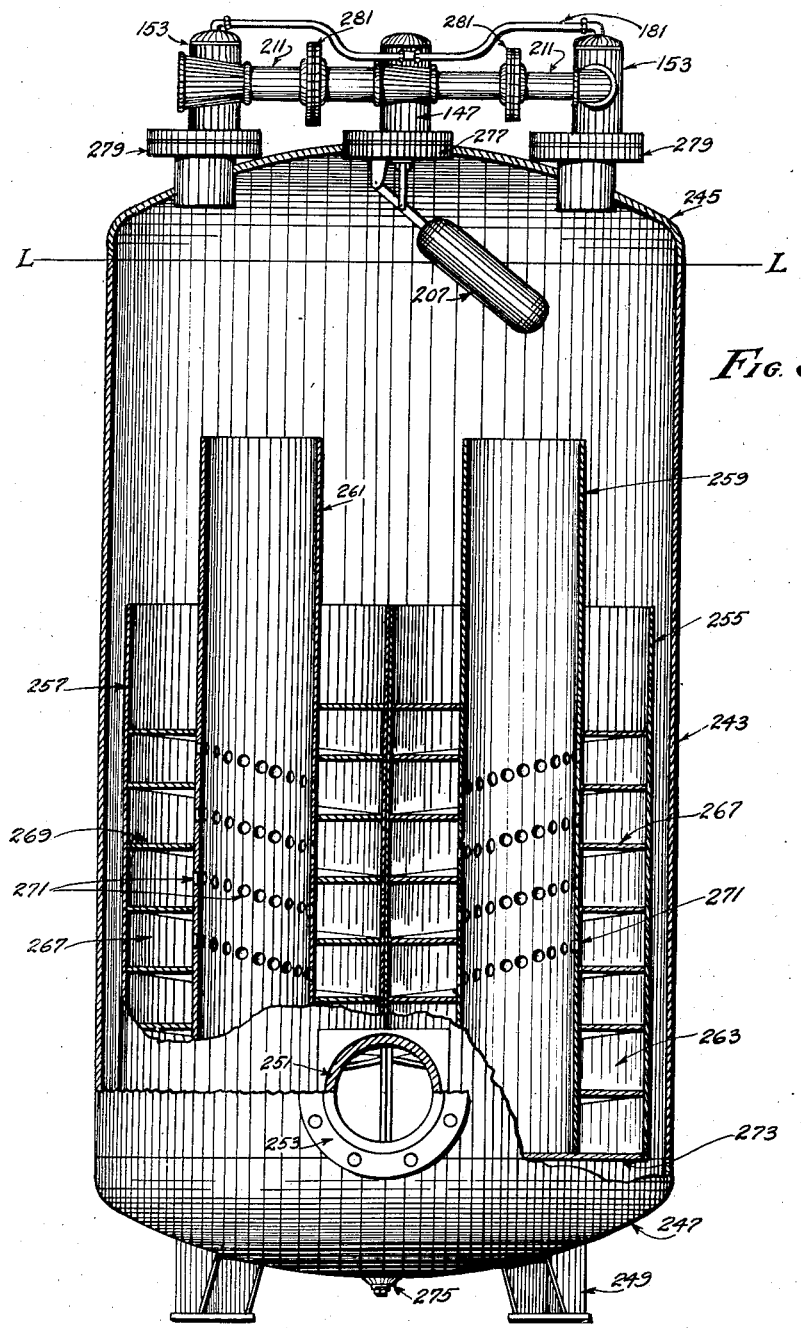

Patented Jan. 14, 1941

2,228,401

UNITED STATES PATENT OFFICE 2,228,401

SEPARATING MECHANISM

Ralph B. Pressler, Fort Wayne, Ind., assignor to S. F. Bowser & Company, Incorporated, Fort Wayne, Ind., a corporation of Indiana Application November 24, 1937, Serial No. 176,283

10 Claims. (Cl. 183—2.5)

The invention disclosed in this application relates to centrifugal means for separating air and other gases or vapors from oils, gasolines and other volatile or non-volatile liquids of similar character for the purpose of preparing such liquids for metering by means of displacement meters such as that disclosed in the patent to H. L. Blum #1,977,424. It is a recognized fact that such meters will measure gases and vapors as well as liquids with the result that the accuracy of the liquid measurement will be impaired if such gases and vapors are not removed from the liquid before it is passed through the meter.

It is recognized that the separation of gases and vapors from liquids by means of centrifugal force has been attempted in a number of instances. However, in working with flows of from 250 to 2500 gallons a minute, certain difficulties have been experienced in securing a high degree of separation and in eliminating the separated gases from the system.

It is an object of the present invention to provide an improved centrifugal gas and liquid separator.

It is a further object of the invention to provide in a liquid and gas separator, a helical liquid conduit, a discharge conduit, and perforations in said conduit arranged in a helical line having greater pitch than that of the liquid conduit.

It is still another object of the invention to provide means for ejecting gases from the closed system.

It is yet another object of the invention to provide a primary gas ejecting means and secondary gas ejecting means for discharging gases from a closed system.

Another object of the invention is to provide primary and secondary gas ejecting means in which the secondary means are under control of the primary means.

A further object of the invention is to provide a float controlled pressure operated gas ejecting valve.

Yet another object is to provide a float controlled pressure operated gas ejecting valve and auxiliary pressure operated gas ejecting valves which are under control of the float controlled valve.

It is another object of the invention to provide a combined gas coalescing and separating device.

It is still another object of the invention to provide centrifugal means for causing minute bubbles of gas in a liquid to coalesce readily.

It is a further object to provide a centrifugal separator device comprising a helical fluid conduit, a cylindrical gas conduit within the fluid conduit, a helical series of openings between the fluid and gas conduits.

It is yet another object of the invention to provide a centrifugal separator device comprising a helical fluid conduit, a cylindrical gas conduit within the fluid conduit, a helical series of openings between the upper turns of the fluid conduit and the gas conduit, the lower turn or turns being entirely closed to form a gas coalescing element.

It is still another object of the invention to provide a centrifugal separator device comprising a helical fluid conduit, a cylindrical gas conduit within the fluid conduit and a series of openings between the fluid and gas conduits to permit passage of gas from the former to the latter, the pitch of the fluid conduit being somewhat diminished in the upper turn to produce a back-pressure in the fluid conduit which assists in discharging the gas into the gas conduit.

It is yet another object of the invention to provide centrifugal means for causing minute gas bubbles to coalesce into large buoyant bubbles and for thereafter separating the coalesced bubbles.

It is a further object of the invention to provide a centrifugal gas and liquid separator having a central gas conducting tube and a helical line of perforations for permitting the gas to pass into said tube.

A further object of the invention is to provide a system of power operated valves which will operate seriatim to eject gas from a normally closed pressure system.

Another object of the invention is to connect a piston of greater area than a valve to operate said valve when substantially the same pressures applied to both piston and valve, and to provide float means for controlling the operation of the piston.

Other objects will become apparent from a study of the specification taken in connection with the accompanying drawings in which:

Figure 3 is an elevation partially in section showing a modified form of separator and gas ejector structure adapted for handling very fast flows of liquid containing gas.

Figure 4 is an enlarged view partially in section showing the gas ejector unit of Figure 1.

Figure 5 is an enlarged view partially in section showing the primary gas ejector unit shown in Figures 2 and 3.

Figure 6 is an enlarged view partially in section showing the secondary gas ejector or power valve unit shown in Figures 2 and 3.

Figure 7 is an enlarged view of the valve and piston structure of Figure 5.

*Separator Structure*

Figure 1:
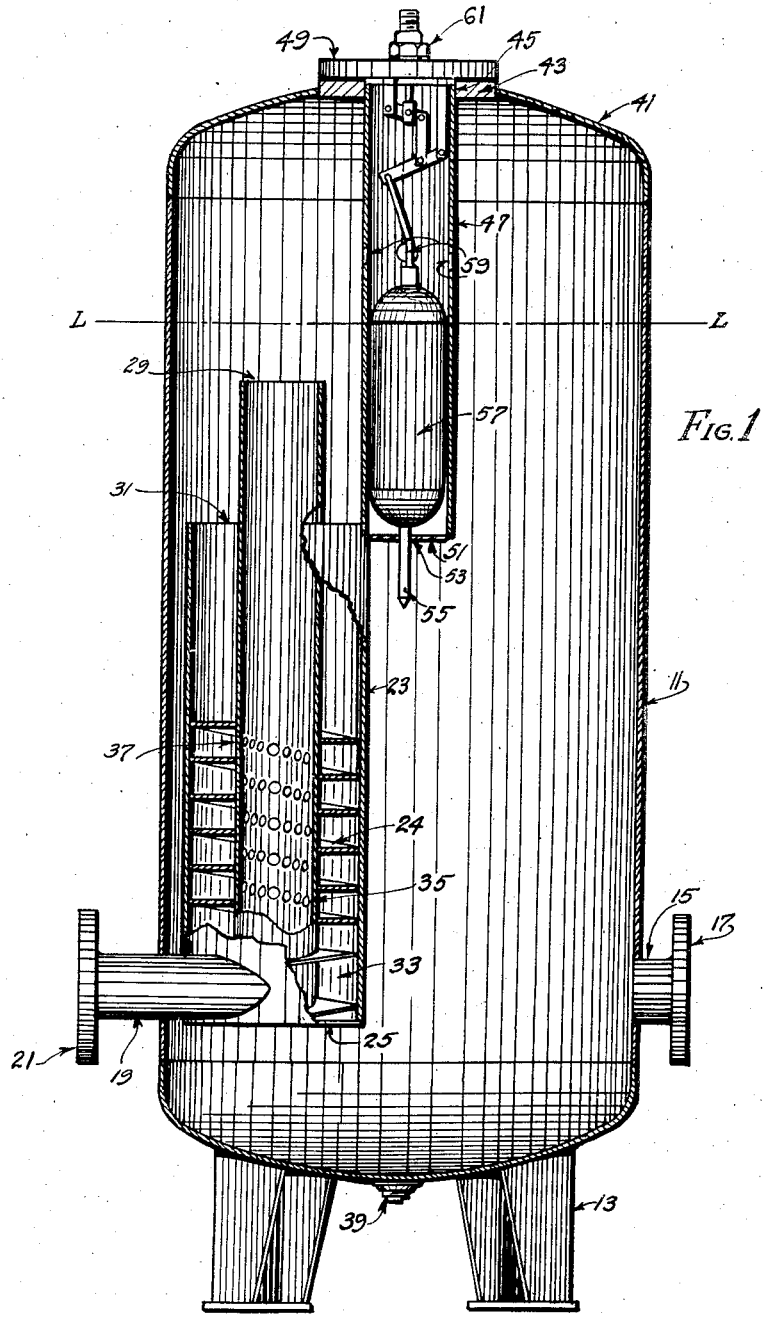
Figure 1 is an elevation partially in section showing a separator and gas ejector structure adapted for handling relatively small flows of liquid containing gas.

Referring to Figure 1, it will be seen that the separating mechanism comprises an elongated and closed cylindrical shell 11 which is provided with heads and which is disposed with its central axis vertical upon legs or supports 13. A discharge conduit 15 having a flange 17 is fixed to the lower portion of the shell while an inlet conduit 19 having a flange 21 adapted for connection with a source of fluid under pressure, which is usually a pump, is arranged to enter the bottom portion of shell 11 and to discharge into the lower portion of a cylindrical separator element 23 which has a bottom head 25, which is open at its upper end 31, and which is supported by brackets (not shown) which are fixed to the shell.

The element 23 is disposed with its vertical axis parallel to but one side of the axis of the shell 11. A cylindrical gas discharge conduit 29 is disposed coaxially within the element 23 and is fixed to the bottom head 25 thereof. A helix 24 having a plurality of convolutions is disposed between the element 23 and the conduit 29 and is fixed to both of said elements to form a helical fluid conduit 33 therebetween. The conduit 19 discharges into said fluid conduit in a substantially tangential direction.

The helix does not extend the full length of the annular chamber formed by element 23 and conduit 29 but terminates at a considerable distance from the upper end 31 of said element 23. The conduit 29 extends a substantial distance beyond the end 31 of element 23 but terminates at a point below the minimum level of liquid in the shell. The minimum liquid level is designated by the line L—L.

The fluid conduit 33 formed by the element 23, conduit 29 and the convolutions of the helix 24 adacent the lower head 25 has no communication through conduit 29 to the interior thereof and the lowermost convolution may be made with a pitch equal to the diameter of the inlet conduit 19 so that there will be no restriction of the flow of liquid into the fluid conduit. However, that portion of the conduit 33 above the convolutions just described is connected with the interior of conduit 29 by means of a series of openings 35 which are arranged in the form of a helix having substantially the same pitch as the helix 24 but leading it by substantially a half pitch.

The fluid conduit 33 may be choked at its upper end as by reducing the pitch of the helix 24 in a portion of the upper convolution in order to create a back-pressure in the channel. This aids in forcing the separated gases into the gas discharge conduit. Thus, the openings will be formed substantially midway of the side wall of the conduit 33 adacent the conduit 29. This series of openings terminates with the last convolution of helix 24 as is indicated by the numeral 37, Figure 1.

A drain fitting 39 is disposed in the lowermost portion of the shell 11 so that sludge and other impurities may be removed from the shell. The upper head 41 of the shell is provided with a fitting 43 having a central opening 45. A tube 47 is inserted in the opening and fixed to the fitting 43. A fitting 49 is provided to cooperate with fitting 43 and supports a gas ejector valve mechanism described below.

Tube 47 is provided with a bottom head 51 which is perforated at 53 to receive a guide pin 55 which is attached to the lower end of an elongated float 57. Openings 59 are provided in the tube 47 a considerable distance above the minimum liquid level so that gases accumulated in the shell 11 may pass out through the valve indicated generally by the numeral 61.

Figure 4 discloses the valve structure in detail. It will be seen from this figure that fitting 49 carries a long stud 63 to which is pivoted at 65 a float operated lever 67. A float supporting stem 69 is pivoted at 71 in the opposite end of lever 67.

A short stud 73 is also attached to the fitting 49 and has pivoted to it at 75 one end of the lever 77. A connecting link 79 is pivoted at 81 to the opposite end of lever 77 and to the lever 67 at a point 83 between the pivots 65 and 71 thereof.

A valve body 85 is screwed into the fitting 49 and is provided with a valve seat 87 which faces toward the interior of shell 11. A valve 89 is mounted for reciprocal motion in said body and is adapted to cooperate with said valve seat. Guide wings 91 on the valve cooperate with a bore in said body which extends coaxially with said valve seat so that the valve will be guided in its motion to and from the seat.

A yoke 93 is adustable mounted in the lower end of the valve member and is pivoted by means of a pin 95 to lever 77 intermediate of the pivots 75 and 81 thereof. The body 85 is externally threaded at 97 so that it may be connected to conduit not shown which will serve to conduct discharged gases to a point of suitable discharge.

*Operation*

Liquid will be forced under pressure through a conduit which is connected by means of a cooperating flange with the flange 21 and by means of conduit 19 and enters the fluid conduit 33 in a substantially tangential direction. The fluid entering the conduit 33 may contain finely divided bubbles of gases and vapors; in fact the fluid entering the conduit may be an emulsion of liquid and gases.

Upon entering the lower convolutions of the conduit 33, a centrifugal force is set up in the liquid which tends to coalesce the fine bubbles of gas so that as the liquid passes to the upper convolutions of the fluid conduit, the gas will be in larger bubbles. Under such conditions, separation of the gas from the liquid by centrifugal force is feasible and for this reason the series of openings 35 appears first in that convolution of the fluid conduit 33 in which the bubbles of air are of sufficient size to permit separation thereof from the liquid without too great a discharge of liquid. The length of conduit 33 necessary to effect substantially complete separating of gasses and liquid will vary with certain factors such as the amount of air entrained in the liquid, the velocity of the liquid passing through the fluid conduit, the pitch of the helix 24 and consequently of the conduit 33 and the static pressure in the shell 11. The conduit 33 is therefore made of sufficient length to eliminate the gases under the worst possible combination of conditions. The solid liquid will be discharged from the annular space between element 23 and conduit 29 above the helix 24 into the body liquid which is maintained above the level in shell 11 indicated by line L—L in Figure 1 and liquid is constantly discharged from the body of liquid through a conduit 15 to a meter and to a receptacle for the degasified liquid.

The gas conduit 29 extends above edge 31 of element 23 so that there will be little danger of again mixing the separated gas with the liquid which is discharged from the annular passage. This conduit 29 terminates below the minimum liquid level, so that the discharge of gases from said conduit will be effected with the least possible turbulence. If the gas conduit terminated above the liquid level, liquid issuing therefrom would splash down into the body of liquid and create a turbulence which would tend to cause the gas to again become entrained in the solid body of liquid. In applicant's construction the gases issue from conduit 29 in large buoyant bubbles which rise rapidly through the liquid overlying the conduit without becoming entrained therein and burst at the surface.

As gas accumulates in the shell 11, the liquid level will be depressed and float 57 which moves with the liquid level will be lowered. An inspection of Figure 4 discloses that lowering of the float causes a downward motion of valve 89 in the body 85 so that the valve will open to permit gases to escape through openings 59 in tube 47 past valve 89, seat 87 and into the atmosphere. The tube 47 guides the float and maintains it in an upright position while the head 51 limits the downward travel thereof so that the valve cannot restrict the discharge passage in the valve body. The gas chamber has a large capacity to assist in cushioning impact.

Unless a severe gas condition exists, the release of gas will result in a rising liquid level which will cause an upward motion of float 57 and a closure of the valve 89 against its seat 87. This cycle will automatically be repeated as often as necessary to maintain the liquid level above the upper terminal of gas conduit 29.

The apparatus just described is capable of handling the flows of up to approximately 250 gallons per minute.

*Modified separator and gas discharge structure*

In handling larger flows than the maximum mentioned above in connection with the apparatus just described, certain difficulties have been encountered which require a modified form of said apparatus.

Figure 2:
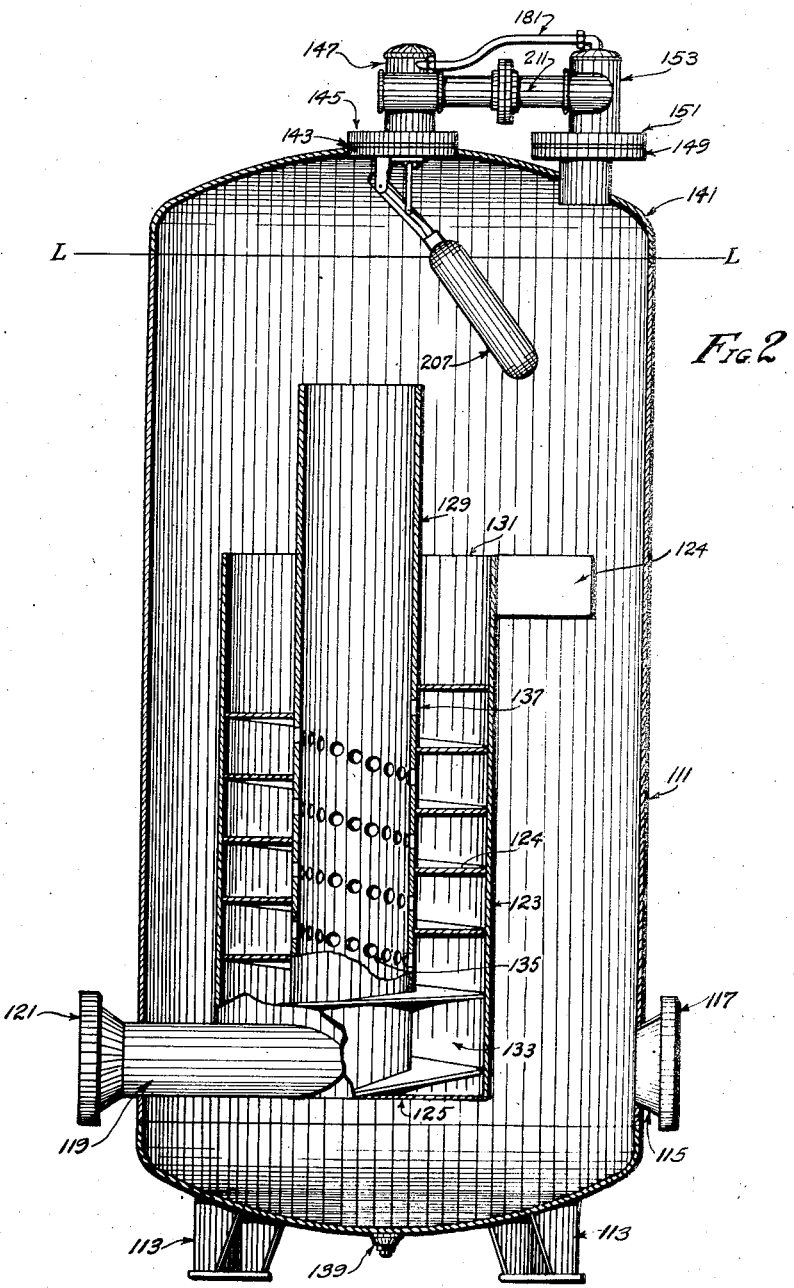
Figure 2 is an elevation partially in section showing a modified form of separator and gas ejector structure adapted for handling moderately fast flows of liquid containing gas.

Figure 2 discloses a shell 111 which is provided with head 5, and which is supported on legs 113. The shell is also provided with a discharge conduit 115 having a flange 117 and with an inlet conduit 119 having a flange 121 adapted for connection with a source of fluid under pressure, which is usually a pump. The inlet conduit 119 discharges tangentially into a helical fluid conduit 133 which is formed by a cylindrical element 123 having a bottom head 125, a helix 124 and a gas discharge tube 129. The element 123 is supported on brackets 124 which are fixed to it and to the shell 111.

The fluid conduit 133 extends in a plurality of convolutions to a point at some distance below the upper end 131 of the element 123. The lower convolution of conduit 133 is of somewhat greater pitch than the rest for the same reason as that advanced in connection with the device of Figure 1. Substantially the lower one and one quarter convolutions of the conduit 133 are imperforate, whereas convolutions of the fluid conduit disposed adjacent said lower convolutions are provided with a series of openings 135 which form communications between said conduit and the interior of the gas discharge conduit 129.

The upper end of conduit 133 may be reduced in cross-sectional area if desired so that a back-pressure will be created in the channel. This may be conveniently accomplished by reducing the pitch of the terminal portion of the helix 124.

It has been determined by experiment that in separators of the size contemplated, the pitch of the helical series of openings 135 should be greater than the pitch of the helix 124 so as to eliminate an undesirable pocketing of gases in the angle formed by the upper and inner walls of the sections of conduit 133 in the upper convolutions thereof.

Thus, while the first opening 135 in the helical series is disposed substantially in the central portion of the inner wall of channel 133, the final or terminal opening of the series 137 which is disposed at the upper end of conduit 133 will be disposed in the upper portion of the inner wall of said conduit. The upper end of gas conduit 129 is located below the minimum liquid level in shell 111, as is indicated by the line L—L in Figure 2, for the purpose set forth above in connection with the mechanism of Figure 1.

Drain fitting 139 is disposed in the lower portion of the shell to permit withdrawal of sludge. The upper head 141 of the shell is provided with a fitting 143 to which may be attached the flange 145 of a valve mechanism indicated generally by the numeral 147. A second fitting 149 is provided in the head 141 eccentrically thereof and is adapted to receive the flange 151 of a power valve indicated generally by the numeral 153 and shown on an enlarged scale in Figure 6.

The valve 147 comprises a valve body 155 which is formed integrally with the flange 145 and which is provided with a gas discharge port 157 which is in communication with a valve opening 159 through the medium of chamber 160 in the body. A member 161 provided with a valve seat 163 is fitted into the opening 159 and is provided with a hub 164 having a valve stem guide opening 165. A second chamber 167 is formed by a recess 169 in the upper end of the valve body and a cap or closure 171 which is adapted to sealingly engage the valve body. The chamber is in the form of a cylinder having its axis coincident with that of the valve seat 163 and guide opening 165 and communicates with the chamber 160 through a port 166.

A liner 173 may be inserted in said cylinder to form a smooth operating surface for the piston 175 which is adapted to operate in said cylinder. A conduit 177 passes through a side wall of said cylinder and enters said cylinder at a point immediately above said piston when it occupies its lowermost position.

Said conduit 177 is internally threaded at 179 to receive a pipe fitting which is formed on the end of conduit 181 shown in Figure 2. The piston 175 is provided with a plurality of ports 183 (see Figures 5 and 7) which are in alignment with ports 166 and which permit communication between cylinder 167 and the chamber 160. The ports 183 terminate in bosses 185 which are raised above the upper surface of the piston and which are adapted to be controlled by a valve 187 which is mounted on a valve rod 189.

A valve member 191 is mounted on a tube 193 which passes through the guide opening 165 and which is fixed at its upper end to the piston 175.

Thus the valve 191 and the piston 175 are mounted to move together. The effective area of piston 175 is considerably greater than the effective area of valve 191 for a purpose which will be described below.

Valve rod 189 passes through tube 193 and is connected at its lower end by means of a pivot 195 to a link 197 which is in turn connected by a pivot 199 to a float operated arm 201. Said arm 201 is pivoted at 203 to a standard 205 which depends from the flange 145 and has connected to it at its opposite end a float 207.

The valve rod 189 is provided at its lower end with a cone shaped valve 190 which is tapered upwardly and which is adapted to cooperate with a valve seat 192 formed in the lower end of the valve stem 193.

A plurality of pins 209 are mounted in said piston 175 in close proximity to the valve 187 so as to hold it in proper cooperative relation over the ports 183. This is necessary because the valve rod 189 has considerable clearance within the tube 193 to permit passage of gas from the interior of the shell 111 into the cylinder 173 through tube 193.

A manifold conduit 211, Figure 2, is adapted to be connected to the opening 157 of the valve body 147, and to opening 217 in the power valve 153. The end of the manifold 211 adjacent valve 147 is open to atmosphere for reasons which will be disclosed below.

Reverting now to the power valve disclosed in Figure 6 and indicated generally by the numeral 153, it will be seen that this valve comprises a body 213 having a chamber 215 which is provided with an opening 217 which passes through the valve body and which is threaded for connection with the conduit 211. The chamber 215 is connected by means of an opening 219 with the interior of shell 111.

A member 221 is fitted in the opening 219 and is provided with a valve seat 223 and a valve stem guide 225. A cylindrical chamber 227 is formed in the upper portion of the valve body and the outer end thereof is closed by cap 229 while a port 228 establishes communication between the cylinder and chamber 215. The cylinder may be provided with a liner 233 so that a smooth working surface will be provided for the piston 231 which is mounted on a stem 235 which projects through chamber 215 and through the guide 225 and carries a valve member 237 at its lower end. The valve is adapted to cooperate with the seat 223 as the piston is operated.

A spring 239 surrounds the valve stem 235 and is confined between the guide 225 and a spring seat 240 on the piston. The effective area of piston 231 is considerably greater than the effective area of the valve 237 for reasons which will be disclosed below.

Operation

In the operation of the equipment just described, liquid will enter the conduit 119 and the conduit 133 where it will be subjected to centrifugal force. Gases and vapors in a finally divided state are dispersed throughout the liquid and the walls of the lowermost convolutions of conduit 133 are imperforate so that the centrifugal force set up in said convolutions will be given an opportunity to force the finally divided air bubbles to collect around conduit 129 where they will coalesce into larger bubbles so that separation of the gases from the liquid will be feasible.

As the liquid with the coalesced gases pass into the upper convolutions of the channel, the liquid being heavier will be thrown against the element 123 while the gases which have collected adjacent the conduit 129 will pass through the openings 135 to the interior of the gas conduit and will be conducted upwardly therein.

Conduit 133 need be extended only to such a length as is required to separate all of the gases from the liquid. This distance will vary with conditions of velocity, quantity of gas, etc., hence the length should be that required to effect complete separation under the worst combination of conditions. The gas free liquid will flow over the edge 131 of member 123 into the main body of liquid in the shell 111 while the gases discharge from the conduit 129 to pass upward through the overlying liquid in the form of large buoyant bubbles which burst at the liquid level and the gas collects in the upper portion of the chamber.

It has been found by experiment that there is a tendency for gas to accumulate in the corner of the conduit 133 formed by the upper and inner walls in the upper convolutions of the conduit. To facilitate the removal of these trapped gases, the pitch of the helical series of openings 135 is made sufficiently greater than the pitch of the conduit 133 so that the openings 135 will be disposed nearer the corner in the upper convolutions of said conduit in which the gases tend to collect.

Normally the float 207 will be raised sufficiently to maintain the valve 190 on its seat 192. Under such conditions the gas pressure in shell 111 will be excluded from the interior of tube 193. The valve 187 will also occupy its uppermost position and will uncover the ports 183 so that the pressure above the piston will be the same as that in chamber 160. The valve 191 will be held against seat 163 because the pressure in the shell is greater than that in the chamber 160. The opening of conduit 177 in the cylinder will be covered by the piston in its upper position.

As the liquid level shell 111 is forced downwardly toward the minimum level indicated by L—L, by an accumulation of gas, the pin 199 will reach the lower end of slot 200 in link 197 whereupon further downward travel of the float will lower valve 190 from its seat, and admit gas to the interior of tube 193. This gas will pass up into cylinder 167 and some of it will escape through ports 183 until the motion of the float is sufficient to seat valve 187 on the ports 183 whereupon a pressure will be built up in the cylinder 173 behind piston 175 which is equal to the pressure on the inside of shell 111. Since the effective area of piston 175 is greater than the effective area of valve 191 which is subjected to the gas pressure mentioned, the downward displacement of the piston 175, tube 193 and valve 191 will ensue and the upper portion of the shell 111 will be connected to atmosphere through opening 159, chamber 160 and the opening 157. At the same time, the piston on reaching its lowermost position will uncover port 177.

After a sufficient quantity of the gas has been vented to atmosphere the liquid level will rise sufficiently to raise the float 207. This motion of the float will be transmitted to valve rod 189 and thence to valves 187 and 190. The latter will be lifted to its seat 192 and will exclude gas under pressure from said tube 193. The just described movement of valve 187 will uncover the ports 183 and the pressure in cylinder 173 will be released through these ports to chamber 160 to balance the pressure on the piston. The gas pressure on valve 191 will close it and with valve 190 will prevent the loss of liquid through the gas discharge passages.

However, under severe gas conditions, it is quite possible that the opening of valve 191 would not relieve the pressure sufficiently to prevent lowering of the liquid level beyond the upper ends of elements 123 or 129 with the result gas might again become entrained in the liquid after passing the separating device. To prevent this the power valve mechanism is provided. It will be recalled that the conduit 177 which leads to pipe 181 was uncovered by the piston 175 in its downward stroke. This pipe 181 is connected with an opening 230 in the cap 229 of the power valve indicated generally by the numeral 153. Thus if the pressure in cylinder 173 should continue to rise in spite of the fact that the valve 191 is open, this increasing pressure will be transmitted through the pipe 181 to the cylinder 227 and when the pressure on piston 231 is sufficient to overcome the spring 239 and the pressure on the valve 237, the power valve 237 will be opened and gases will be discharged through the opening 219, the chamber 215 in the power valve body, opening 217 and conduit 211 to atmosphere so that there will now be two gas discharge valves functioning to relieve the gas pressure in shell 111.

As the pressure is relieved, the spring 239 in the power valve and the gas pressure on valve 237 will over-balance the pressure on the piston 231 and the power valve will close and thereafter, if the gas pressure drops still further, the rising liquid level acting on float 207 will close the valve 190 and the gas discharge will be terminated by valve 191 in the manner just described.

The apparatus just described is capable of handling flows of liquid up to 100 gallons a minute.

*The twin separator mechanism*

For separating gases from liquid which is flowing at rates of up to 2500 gallons a minute, it is convenient to divide the flow and treat each portion of the stream individually in a separator element. The mechanism for accomplishing this is disclosed in Figure 3 in which a shell 243 is formed with top and bottom heads 245 and 247, respectively, and is maintained with its longitudinal axis vertical by legs or supports 249.

The inlet conduit 251 is provided with a flange 253 for connection with a pipe line. Two cylinders 255 and 257 are mounted within the shell and in contact with each other by means of brackets (not shown) and the conduit 251 merges with these cylinders in a direction such that its axis forms the tangent of both of said cylinders at their point of contact.

Gas conduits 259 and 261 are disposed concentrically with respect to said cylinder 255 and 257, respectively, and the annular space between the cylinder 255 and conduit 259 is formed into a helical fluid conduit 263 by means of a left hand helix 265 while the annular space between cylinder 257 and conduit 261 is formed into a helical fluid conduit 267 by a right handed helix 269.

The lower convolution of each of the conduits 263 and 267 is of greater pitch than the remainder to receive the flow from conduit 251 without substantially restricting it. In this modification substantially the lower two convolutions of the fluid conduit have imperforate walls whereas the convolutions of the conduits adjacent said lower convolutions are provided with a series of openings 271 arranged in the form of a helix having a greater pitch than the associated helix 267 or 269 but being in the same direction as the associated helix and leading it a distance equal to substantially half the pitch thereof. Thus the lowermost opening of each series is disposed substantially in the middle of the vertical wall of the fluid conduit formed by a gas discharge conduit while the uppermost opening of each series is disposed above the center of the fluid conduit wall formed by the gas discharge conduit. The fluid conduits terminate short of the cylinders 255 and 257 and thus discharge into an annular space between said cylinders and the gas discharge conduits. While the latter extend substantially above the ends of said cylinders.

In order to secure the pressure in the fluid conduits necessary to force gas from said conduit through the openings into the gas conduits when the velocity of the fluid is not sufficient to create the centrifugal force necessary to produce this pressure, approximately the last half of the upper convolution of each conduit is made with a gradually diminishing pitch, or in other words, it is "choked" to reduce its cross-sectional area.

Bottom heads such as the head 273 close the lower ends of both the cylinders 255 and 257 and the gas discharge tubes, 259 and 261, so that the liquid can flow only in an upward direction through the fluid conduit. A sludge drainout connection 275 is provided in the lower head 247. A fitting 277 is provided centrally of the upper head 245 for the reception of the fitting 145 of a float operated valve such as that disclosed in Figure 5 while connections 279 are provided eccentrically of the head to receive power valves such as those disposed in Figure 6.

Connections 281 are provided for facilitating the assembly of the gas discharge conduit 211 and the pipe 181 is connected to transmit pressure from the piston chamber of the float valve 147 to the cylinders 227 of each of the power valves 153.

*Operation*

In operation liquid having gas entrained therein will enter the fluid conduits 263 and 269 from the inlet conduit 251, the flow in each of said fluid conduits being substantially half of that in the inlet conduit. In the lower convolutions of said fluid conduits, the finely divided gas bubbles will coalesce adjacent the gas conduits due to the centrifugal forces set up by the flow of liquid in the helical conduit and by the time the fluid reaches the portion of the conduit which is provided with the helical series of openings, the bubbles will be of sufficient size to render centrifugal separation of the gas and liquid feasible.

This separation is effected as the liquid and entrained gas flows through the remainder of the convolutions. A sufficient number of convolutions are provided so that when the liquid is discharged into annular space between the cylinders and gas conduits, the liquid will be substantially free of gases. Liquid being more dense than the entrapped gases will be thrown against the wall of the fluid conduit formed by the cylinder, while the gases will collect adjacent the gas tube 259 and will be forced by the pressure in the fluid conduit through the openings in the inner walls of said conduit to the interior of the gas discharge tube.

The upper ends of these tubes are disposed below the liquid level in the shell 243 which is indicated by the line L—L (Figure 3) and the gas discharged from the tubes rises through the liquid in large buoyant bubbles which burst at the liquid level and collect beneath the head 245. The gas free liquid merges with the solid body of liquid in shell 243 and passes through the discharge opening in the shell 111 which is not shown but which is disposed substantially in alignment with the inlet conduit 251.

As gas collects in the upper portion of said shell, the liquid level will be depressed, float 207 will be lowered and will effect the opening of valves 190 and 191 through the mechanism disclosed in Figure 5 and described above so that gas may be discharged through the conduit 211 to atmosphere. The pressure in the shell 243 is transmitted by pipe 181 to the cylinders of the power valves when the valve 191 is fully opened so that they will be operated in the manner described above in the event that the gas pressure increases in spite of the opening of valve 191.

Generally the springs 239 in the power valves are placed under different tensions so that a different pressure in the pipe 181 is required to cause the operation of each of the valves. Thus if the gas pressure in the shell is great, the float control valve 191 and both of the power valves will be opened to relieve the gas pressure and to pass the gas to atmosphere. As the pressure in the chamber is reduced, however, the power valve having the stronger spring 239 will first close and as the pressure is further reduced the power valve having the weaker spring will be closed while the valve 191 will not be closed until the float 207 is raised by a rising liquid level.

The "choked" construction of the fluid conduit described in connection with this modification may obviously be applied to the other modifications disclosed if this is necessary or desirable and likewise the principle of disposing the openings in the gas conduit in a helix having a pitch greater than that of the fluid conduit may be applied to the unit disclosed in Figure 1.

In any given case the number of convolutions having imperforate walls necessary to effect the coalescence of the gas bubbles will be governed by the conditions under which the fluid is being treated and the nature of the fluid. If too few convolutions are provided, a great deal of liquid carrying many small bubbles will pass into the gas discharge conduit and these bubbles will not have sufficient buoyancy to carry them up to the gas collecting chamber. Consequently separation will be incomplete.

Similarly if too few convolutions having perforated walls are provided, not all the gas will be forced out of the fluid channel and an incomplete separation will be had.

The velocity of the liquid passing through the fluid channel must create sufficient centrifugal force in the fluid to effect the separation of the gas from the liquid and to generate sufficient pressure in the conduit to force the gas therefrom. The latter condition can be assisted by the described choking of the channel.

It is obvious that various changes may be made in the form, construction and arrangement of the parts disclosed above by way of illustration and therefore applicant does not desire to be limited to the specific forms shown in the drawings and described herein but desires instead to be limited only to construction which fall fairly within a scope of the appended claims.

What I claim to be new and desire to protect by Letters Patent of the United States of America is:

1. In a gas and liquid separating device, a chamber, means for maintaining liquid in said chamber above a predetermined level, concentric upwardly directed tubes, mounted in said chamber, means for closing the lower ends thereof, a helix extending between said tubes and joined therewith to form a helical fluid conduit therewith, means forming openings connecting said conduit with the inner one of said tubes, said inner tube extending beyond the upper end of said outer tube but terminating in an opening disposed below said predetermined liquid level.

2. In a gas and liquid separating device, a chamber, means for maintaining liquid in said chamber above a predetermined level, means forming a helical conduit comprising a plurality of convolutions, an upwardly directed tube disposed substantially at the axis of said helical conduit, means forming radially inwardly directed openings for connecting said conduit with said tube, said openings being arranged in a single helical series having a pitch greater than that of the helical conduit, said tube having its upper end open and disposed below said predetermined level.

3. In a gas and liquid separator device, a chamber, means for maintaining liquid in said chamber above a predetermined level, wall means forming a helical separating conduit having a plurality of convolutions, an upwardly directed tube encompassed laterally by said conduit, means forming a helically arranged series of radially inwardly extending openings in said conduit for connecting it with said tube, said conduit having liquid inlet and outlet openings at opposite ends, said series of openings terminating in a convolution in advance of that adjacent the outlet opening, the helix of said series of openings being substantially a half pitch in advance of the helix of said conduit, said tube being open at the top and terminating at a point below said predetermined level.

4. In a liquid and gas separating device, the combination of a container, means for maintaining the liquid in the container above a predetermined level, means associated with said container for separating the liquid and the gases entrained therein, said separating means comprising a centrifugal separating device having a gas collecting portion, a substantially vertical gas discharge tube, passages connecting the gas collecting portion of said separating device with said tube, said separating device and said tube having gas free liquid and gas discharge outlets respectively, both of which terminate below the level of liquid in said chamber, said gas outlet being upwardly directed in said chamber and being open at its upper end, and said liquid outlet being disposed at a lower level than said gas outlet.

5. In a gas and liquid separating device, the combination of a container, a gas and liquid separator in said container comprising a helical separating element, means for supplying a flow of liquid mixed with gas to said separating element, an upwardly directed gas discharge conduit for said separating element, passages for connecting the central gas collecting portions of said helical element with said gas discharge conduit, said separating element having a conduit for discharging gas free liquid upwardly into said container, gas discharge means for said container, means responsive to the level of liquid in said chamber for controlling said gas discharge means to maintain said liquid level above a predetermined minimum, said gas discharge conduit being provided with a gas discharge opening in its upper end, disposed below said minimum level of liquid.

6. In a gas and liquid separating device, the combination of means forming a chamber, means for normally maintaining liquid above a predetermined level in said chamber, a separator unit in said chamber comprising a helical separator conduit, a gas conduit disposed substantially parallel to the axis of said helical conduit and connected to the inner gas collecting portion thereof by a series of passages, said gas conduit being upwardly directed and open at the top, said conduits being adapted to discharge gas and gas free liquid into said body of liquid below said level, means for supplying a flow of fluid to said separator unit, said liquid level maintaining means comprising a gas vent valve, mounted to move outwardly to close, a motor connected to operate said valve, a float in said container, means for mounting said float to enable it to follow the level of liquid in the chamber, and means operated by said float for controlling the operation of said motor.

7. In a gas and liquid separating device, the combination of means forming a chamber, means for normally maintaining liquid above a predetermined level in said chamber, a separator unit in said chamber comprising a spiral separator conduit, an upwardly directed gas discharge conduit open at the top and disposed substantially parallel to the axis of said spiral, gas passages connecting the radially inner portion of said spiral conduit with said gas conduit, and a liquid discharge conduit connected with said spiral conduit, said conduits being adapted to discharge gas and liquid separately into said body of liquid below said level, means for supplying a flow of fluid to said separator unit, said liquid level maintaining means comprising a gas vent valve, mounted to move outwardly to close, a motor connected to operate said valve, a float mounted to enable it to follow the level of liquid in the chamber, control means for said motor, means connecting said control means for operating by said float to effect an opening of said valve as the liquid level falls.

8. In a gas and liquid separator, the combination of a chamber, means for normally maintaining liquid above a predetermined level in said chamber, a separator unit mounted in said chamber comprising a spiral conduit adapted to separate gases and liquid and connected by gas passages to an upwardly directed gas discharge conduit open at the top, said gas and spiral conduits being adapted for discharging said gas and liquid individually into said chamber below said level, said liquid level maintaining means comprising a primary vent valve, power means for operating said valve, control means for governing the operation of said power means in accordance with the volume of separated gases in said chamber, a secondary vent valve, secondary power means for operating said secondary valve, control means for governing said last named valve in accordance with both the volume and the pressure of the gases in said chamber.

9. In a gas and liquid separator, the combination of a chamber, means for normally maintaining liquid above a predetermined level in said chamber, a spiral separator conduit mounted in said chamber adapted to separate gases and liquid, an upwardly directed gas discharge conduit provided with an opening at its upper end below the liquid level, gas passages for connecting the gas collecting portions of said spiral conduit with said gas conduit and a liquid discharge opening for said spiral conduit disposed below said level for discharging liquid from said spiral conduit into said chamber, said liquid level maintaining means comprising a primary vent valve, pressure responsive means for operating said valve and float operated means for controlling the admission of gases from said chamber to said pressure responsive means.

10. In a gas and liquid separator, the combination of a chamber, means for normally maintaining liquid above a predetermined level in said chamber, a separator unit mounted in said chamber adapted to separate gases and liquid and comprising a centrifugal gas separating unit, an upwardly directed gas discharge conduit provided with an opening at its upper end below the liquid level, gas passages connecting said separating and gas conduits, and a discharge for said separating conduit opening below said level for discharging liquid into said chamber, said liquid level maintaining means comprising a primary vent valve, pressure responsive means for operating said valve and float operated means for controlling the admission of gases from said chamber to said pressure responsive means, secondary vent valve means, pressure responsive means for operating said secondary valve means, means under control of said first named pressure responsive means for controlling the admission of gases from said chamber to said pressure responsive means for said secondary valve means.

RALPH B. PRESSLER.